I. ILIEFF.
RESILIENT SPOKE.
APPLICATION FILED JULY 11, 1919.
1,341,907.
Patented June 1, 1920.
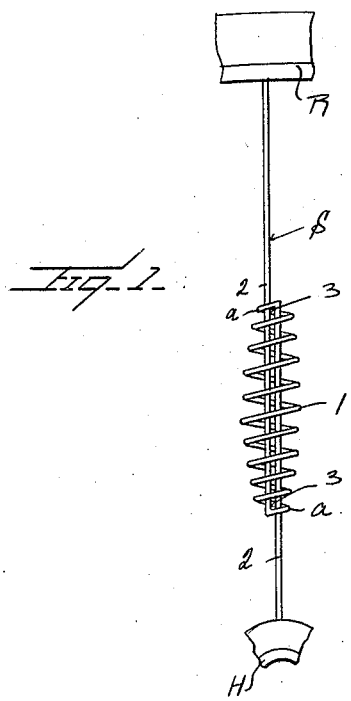
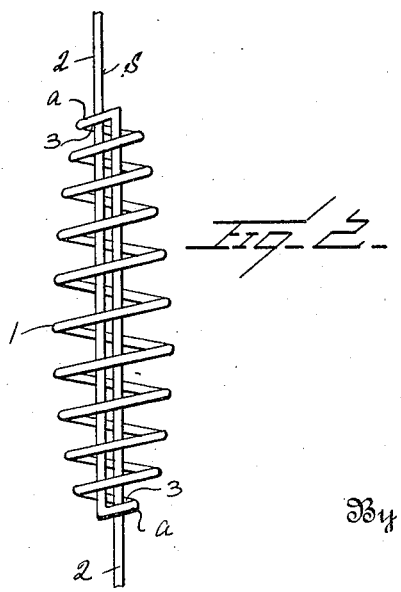
Inventor
Ilion Ilieff
By Watson E. Coleman
Attorney

UNITED STATES PATENT OFFICE.

ILION ILIEFF, OF DETROIT, MICHIGAN.

RESILIENT SPOKE.

1,341,907.  Specification of Letters Patent.  Patented June 1, 1920.

Application filed July 11, 1919. Serial No. 310,223.

*To all whom it may concern:*

Be it known that I, ILION ILIEFF, a subject of the King of Bulgaria, residing at Detroit, in the county of Wayne and State of Michigan, have invented certain new and useful Improvements in Resilient Spokes, of which the following is a specification, reference being had to the accompanying drawings.

This invention relates to certain improvements in resilient spokes, and it is an object of the invention to provide a novel and improved device of this general character which when in applied position, operates to minimize the shocks and jars of a wheel incident to the travel of the wheel.

Another object of the invention is to provide a novel and improved spoke including an expansible portion which serves to absorb the shocks and jars imposed upon the wheel of which the spoke forms a part.

The invention consists in the details of construction and in the combination and arrangement of the several parts of my improved resilient spoke whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

It is to be understood that in practice it is my purpose to provide a wheel structure wherein all of the spokes are similarly constructed but for the purpose of disclosure a detailed description and illustration of a single spoke is believed to be sufficient.

As herein embodied, my improved spoke S is formed of a single strand of material of requisite strength and which has an intermediate portion coiled to form a helical spring 1 with the opposite end portions 2 of the spoke or strand reversely disposed and extending in opposite directions through the spring or helical portion 1 so that when a load is imposed upon the spoke S or the wheel structure of which said spoke forms a part, the spring or helical portion 1 will expand to compensate for the shocks and jars incident to travel.

It is also preferred that the end convolution $a$ of the spring or helical portion 1 be of materially reduced diameter so that the portions 2 of the spoke pass through restricted openings 3 whereby the spoke S is effectually protected against buckling.

It is to be understood that one end portion of the spoke S is adapted to be attached in any desired manner with the hub H of the wheel structure and the opposite end portion to the rim R of the wheel structure.

From the foregoing description, it is thought to be obvious that a resilient spoke constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A spoke for a wheel consisting of a single strand of material having an intermediate portion formed into a helical spring, the opposite end portions of the strand being reversely directed through the helical spring.

2. A spoke for a wheel consisting of a single strand of material having an intermediate portion formed into a helical spring, the opposite end portions of the strand being reversely directed through the helical spring, the convolutions at the opposite end portions of the spring being of reduced diameters.

In testimony whereof I hereunto affix my signature in the presence of two witnesses.

ILION ILIEFF.

Witnesses:
 W. E. LAWSON,
 CLARA REED.